United States Patent [19]

Kaneko

[11] Patent Number: 4,948,166
[45] Date of Patent: Aug. 14, 1990

[54] VEHICULAR HEIGHT REGULATION SYSTEM WITH VARIABLE SENSITIVITY DEPENDING UPON VEHICLE DRIVING CONDITION

[75] Inventor: Takanobu Kaneko, Kanagawa, Japan

[73] Assignee: Nissan Motor Company, Limited, Yokohama, Japan

[21] Appl. No.: 275,985

[22] Filed: Nov. 25, 1988

[30] Foreign Application Priority Data

Nov. 24, 1987 [JP] Japan ................ 62-295874

[51] Int. Cl.$^5$ ............................................ B60G 17/00
[52] U.S. Cl. ....................................... 280/707; 180/41
[58] Field of Search ................ 280/707, 6.1, 703, 772, 280/840; 180/41

[56] References Cited

U.S. PATENT DOCUMENTS

| | | | |
|---|---|---|---|
| 4,436,318 | 3/1984 | Ichikawa et al. | 280/707 |
| 4,526,401 | 7/1985 | Kakizaki et al. | 280/707 |
| 4,527,676 | 7/1985 | Emura et al. | 188/299 |
| 4,600,215 | 7/1986 | Kuroki et al. | 280/707 |
| 4,616,848 | 10/1986 | Sugasawa et al. | 280/707 |
| 4,660,853 | 4/1987 | Jephcott | 280/707 |
| 4,715,289 | 12/1987 | Okamoto | 280/707 |
| 4,772,547 | 2/1988 | Kishi et al. | 280/807 |

FOREIGN PATENT DOCUMENTS

58-112817  7/1983  Japan.

*Primary Examiner*—Richard A. Bertsch
*Attorney, Agent, or Firm*—Foley & Lardner, Schwartz, Jeffery, Schwaab, Mack, Blumenthal & Evans

[57] ABSTRACT

A vehicular height regulating system monitors a vehicular height level. The monitored height level is compared with upper and lower criteria which are higher than and lower than a predetermined target height level in a given magnitude. The system generally performs height adjustment for rising or lowering the actual vehicular height when the monitored vehicular height is out of a target height range defined by the upper and lower criteria. The system also monitors an a preselected vehicular driving parameter which reflects vehicular running condition. The system adjusts the upper and lower criteria depending upon the monitored vehicular driving parameter.

23 Claims, 4 Drawing Sheets

VEHICULAR HEIGHT REGULATION SYSTEM WITH VARIABLE SENSITIVITY DEPENDING UPON VEHICLE DRIVING CONDITION

BACKGROUND OF THE INVENTION

1. Field of the Invention

The present invention relates generally to a vehicular height regulation system for regulating the vehicular height within a predetermined target height range. More specifically, the invention relates to a vehicular height regulation system which is variable of sensitivity level in detecting vehicular height change out of the target height range.

2. Description of the Background Art

One of typical vehicular height control system has been disclosed in the Japanese Patent First (unexamined) Publication (Tokkai) Showa 58-112817. In the disclosed, the system monitors vehicular height level and compares the monitored height level with a predetermined upper and lower limit defining a target height range set about a predetermined target height. When the vehicular height monitored is lower than the lower limit, height adjustment for rising the vehicular height is performed so as to regulate the vehicular height within the target height range. On the other hand, when the vehicular height is higher than the upper limit, height adjustment is performed for lowering the height to the upper limit.

In such vehicular height regulation system has fixed height range to define the deadband about the target height level regardless of the vehicular driving condition. Therefore, sensitivity level of vehicular height variation for detecting vehicular height varying out of or into the target height range is constant at all vehicular driving condition. In such conventional vehicular height regulation system, a difficulty is encountered in determining the height range to be set about the target height level. Namely, when the height range is set at excessively narrow, then the vehicular height control system becomes excessively sensitive to the height variation so as to carry out height regulating operation to maintain the vehicular attitude even during concerning. This causes difficulty for the driver to realize the critical speed for passing the corner. Furthermore, when height adjustment is performed during cornering, vehicular steering characteristics tends to be changed toward over-steer characteristics to degrade cornering stability and drivability. On the other hand, when the height range to be set about the target height level is excessively broad, the control system may allow substantial vehicular height variation and thus allows substantial vehicular attitude changes to cause degradation of the riding comfort.

SUMMARY OF THE INVENTION

In view of this, it is a primary object of the present invention to provide a vehicular height regulation system which has a variable sensitivity level to vehicular height variation according to the vehicular driving condition.

Another object of the invention is to provide a vehicular height regulating system which is variable of a target height range set about a target height level for adapting the sensitivity level to the vehicular driving condition.

A further object of the invention is to provide a vehicular height regulating system which is variable of the sensitivity level depending upon a vehicular driving condition reflecting parameter, such as an acceleration exerted on the vehicular body.

In order to accomplish aforementioned and other objects, a vehicular height regulating system, according to the present invention, monitors a vehicular height level. The monitored height level is compared with upper and lower criteria which are higher than and lower than a predetermined target height level in a given magnitude. The system generally performs height adjustment for rising or lowering the actual vehicular height when the monitored vehicular height is out of a target height range defined by the upper and lower criteria. The system also monitors an a preselected vehicular driving parameter which reflects vehicular running condition. The system adjusts the upper and lower criteria depending upon the monitored vehicular driving parameter.

According to one aspect of the invention, a vehicle height regulation system comprising:

a suspension system interposed between a vehicle body and a suspension member rotably supporting a vehicular wheel, the suspension system including a variable pressure chamber filled with a working fluid for producing a suspension force for suspending the vehicular body on the suspension member a fluid circuit including a pressurized working fluid source and connected to the variable pressure chamber for adjusting pressure in the variable pressure chamber and whereby adjusting suspension force to be produced by in the variable pressure chamber a first sensor for monitoring vehicular body height level to produce a first sensor signal representative thereof a second sensor for monitoring preselected vehicular driving parameter representative of the vehicle driving condition to produce a second sensor signal representative thereof a controller means for setting a target vehicular height range about a predetermined target height level on the basis of the second sensor signal value, and controls the fluid circuit for adjusting the suspension force to maintain the vehicular height within the target vehicular height range on the basis of the first sensor signal value.

According to another aspect of the invention, a vehicle height regulation system comprising:

a suspension system interposed between a vehicle body and a suspension member rotatably supporting a vehicular wheel, the suspension system including a variable pressure chamber filled with a working fluid for producing a suspension force for suspending the vehicular body on the suspension member;

a fluid circuit including a pressurized working fluid source and connected to the variable pressure chamber for adjusting pressure in the variable pressure chamber and whereby adjusting suspension force to be produced by in the variable pressure chamber;

a first sensor for monitoring vehicular body height level to produce a first sensor signal representative thereof;

a second sensor for monitoring preselected vehicular driving unstability factor to produce a second sensor signal representative thereof;

a controller means for setting a target vehicular height range about a predetermined target height level on the basis of the second sensor signal value, and controls the fluid circuit for adjusting the suspension force to maintain the vehicular height within the target vehicular height range on the basis of the first sensor signal value.

According to a further aspect of the invention, a vehicle height regulation system comprising:

a suspension system interposed between a vehicle body and a suspension member rotatably supporting a vehicular wheel, the suspension system including a variable pressure chamber filled with a working fluid for producing a suspension force for suspending the vehicular body on the suspension member;

a fluid circuit including a pressurized working fluid source and connected to the variable pressure chamber for adjusting pressure in the variable pressure chamber and whereby adjusting suspension force to be produced by in the variable pressure chamber;

a first sensor for monitoring vehicular body height level to produce a first sensor signal representative thereof;

a second sensor for monitoring an acceleration to be exerted on the vehicular body to to produce a second sensor signal representative thereof;

a controller means for setting a target vehicular height range about a predetermined target height level on the basis of the second sensor signal value, and controls the fluid circuit for adjusting the suspension force to maintain the vehicular height within the target vehicular height range on the basis of the first sensor signal value.

Preferably, the controller means initially sets the target height range at a narrowest range and to set wider range in response to increasing of the acceleration. The controller means maintains the target height range at a narrowest range when the acceleration is maintained smaller than or equal to a predetermined threshold and set to a wider range when the acceleration is greater than the threshold. In the alternative, the controller means initially set the narrowest target height range at minimum acceleration and linearly expands the target height range. The controller means expands the target height range in proportion to increasing of the acceleration.

The second sensor monitors at least one of the lateral acceleration, longitudinal acceleration, or vertical acceleration. Alternatively, the second sensor monitors a laterally exerted, longitudinally exerted and vertically exerted accelerations to adjust the target height range in response to any one of the laterally exerted, longitudinally exerted and vertically exerted accelerations

DESCRIPTION OF THE PREFERRED EMBODIMENT

Figure 1:
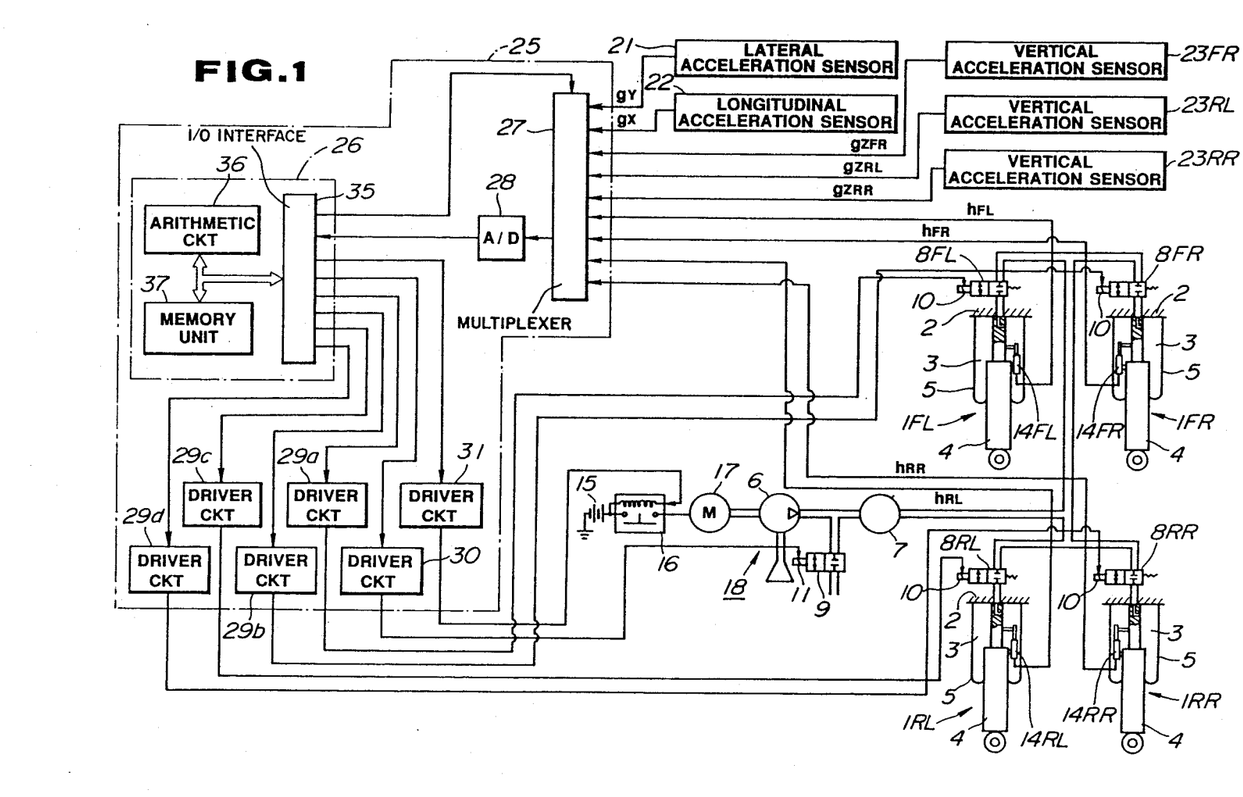
FIG. 1 is a schematic block diagram of the preferred embodiment of the vehicular height suspension system according to the present invention, which implements vehicular height regulation according to the preferred process taken according to the invention.

Referring now to the drawings, particularly to FIG. 1, the preferred embodiment of a vehicular height regulation system, according to the present invention, is applied for vehicular suspension systems 1FL, 1FR, 1RL and 1RR which suspend a vehicular body 2 on front left, front right, rear left and rear right wheels (not shown). In the following discussion, the suspension systems 1FL, 1FR, 1RL and 1RR will be represented by the reference numeral "1" as generally referred to.

Each suspension system 1 comprises a hydraulic shock absorber 4 and a pneumatic chamber 3 defined above the shock absorber. The hydraulic shock absorber 4 may be a variable damping force shock absorber which is variable of damping characteristics depending upon the vehicular driving condition. Such variable damping force shock absorber will be automatically adjustable of the suspension mode for hardening and softening depending upon the vehicular driving conditions. For example, the variable damping force shock absorber and control operation thereof have been disclosed in the following co-pending applications and published applications.

---

U.S. Pat. application Ser. No. 650,705, filed on Sep. 14, 1984
U.S. Pat. application Ser. No. 691,531, filed on Jan. 15, 1985
U.S. Pat. application Ser. No. 649,484, filed on Sep. 11, 1984
U.S. Pat. application Ser. No. 678,806, filed on Dec. 6, 1984
U.S. Pat. application Ser. No. 647,648, filed on Sep. 6, 1984
U.S. Pat. application Ser. No. 573,504, filed on Jan. 24, 1984
U.S. Pat. application Ser. No. 751,513, filed on Jul. 3, 1985
U.S. Pat. application Ser. No. 744,380, filed on Jul. 13, 1985
U.S. Pat. application Ser. No. 744,379, filed on Jul. 13, 1985
U.S. Pat. application Ser. No. 740,988, filed on Jun. 4, 1985
U.S. Pat. application Ser. No. 791,061, filed on Oct. 24, 1985
U.S. Pat. application Ser. No. 823,119, filed on Jan. 27, 1986
U.S. Pat. application Ser. No. 730,564, filed on May 8, 1985
U.S. Pat. application Ser. No. 737,937, filed on May 28, 1985
U.S. Pat. application Ser. No. 663,933, filed on Oct. 23, 1984
U.S. Pat. application Ser. No. 657,296, filed on Oct. 3, 1984
U.S. Pat. application Ser. No. 463,334, filed on Feb. 2, 1983
U.S. Pat. application Ser. No. 476,791, filed on Mar. 18, 1983
U.S. Pat. application Ser. No. 746,403, filed on Jun. 19, 1985
U.S. Pat. application Ser. No. 906,239, filed on Sep. 12, 1986
U.S. Pat. application Ser. No. 818,265, filed on Jan. 13, 1986
U.S. Pat. No. 4,436,318, issued on Mar. 13, 1984
U.S. Pat. No. 4,401,301, issued on Aug. 30, 1983
U.S. Pat. No. 4,600,215, issued on Jul. 15, 1986
U.S. Pat. No. 4,616,848, issued on Oct. 14, 1986
U.S. Pat. No. 4,527,676, issued on Jul. 9, 1985
U.S. Pat. No. 4,526,401, issued on Apr. 1, 1986

---

All of the above-listed co-pending applications and issued patents are commonly assigned to the assignee of the present invention. The disclosures of these co-pending applications and patents are herein incorporated by reference for the sake of disclosure.

The pneumatic chamber 3 is defined by means of a rolling diaphragm 5. The pneumatic chamber 3 is communicated with a compressor 6 as a source of pressurized gas, such as air, via a pneumatic circuit. The compressor 6 is designed to be driven by an electric motor 17. The motor 17 is driven by an electric power supplied from a vehicular battery 15 supplied via a relay 16.

A driver 7, e.g. air driver, is disposed in the pneumatic circuit at the orientation downstream of the compressor 6 for drying the pressurized gas supplied from the compressor. Also, pressure control valves 8FL, 8FR, 8RL and 8RR are disposed in the pneumatic circuit in the vicinity of the respective inlets of the associated pneumatic chamber 3 for introducing and ventilating the pressurized gas thereinto and therefrom. A ventilation control valve 9 is provided in a ventilation port of the pneumatic circuit for establishing and blocking fluid communication between the pneumatic circuit and atmosphere. The pressure control valves 8FL, 8FR, 8RL and 8RR and the ventilation control valve 9 are cooperated with electromagnetic solenoids 10 and 11. These solenoids 10 and 11 are operative for switching valve positions of respectively associated pressure control valves 8FL, 8FR, 8RL and 8RR and the ventilation control valve 9.

For respective suspension systems 1FL, 1FR, 1RL and 1RR, stroke sensors 14FL, 14FR, 14RL and 14RR are provided in order to monitor relative distance between the vehicular body 2 and suspension members (not shown) which rotatably support front left, front right, rear left and rear right wheels. The stroke sensors 14FL, 14FR, 14RL and 14RR may comprise potentiometer for varying outputs depending upon the relative distances between the vehicular body 2 and the suspension members. The outputs of the stroke sensors 14FL, 14FR, 14RL and 14RR will be hereafter referring to as "vehicular height indicative signals $h_{FL}$, $h_{FR}$, $h_{RL}$ and $h_{RR}$. These stroke sensors 14FL, 14FR, 14RL and 14RR are connected to a control unit 25 which will be discussed later.

The control unit 25 is also connected to a lateral acceleration sensor 21, a longitudinal acceleration sensor 22 and vertical acceleration sensors 23FR, 23RL and 23RR. The lateral acceleration sensor 21 is provided at appropriate position of the vehicular body and monitors lateral acceleration exerted on the vehicular body 2. The lateral acceleration sensor 21 outputs a lateral acceleration signal $g_y$ indicative of the monitored lateral acceleration. The longitudinal acceleration sensor 22 monitors longitudinal acceleration to produce a longitudinal acceleration indicative signal $g_x$ indicative of the monitored longitudinal acceleration. Similarly, respective vertical acceleration sensors 23FR, 23RL and 23RR are provided in the vicinity of the suspension systems so as to monitor vertical accelerations exerted on the vehicular body at the positions of the front right, rear left and rear right suspension systems. The output signals of the vertical acceleration sensors 23FR, 23RL and 23RR will be hereafter referred to as "front right acceleration indicative signal $g_{zFR}$", "rear left acceleration indicative signal $g_{zRL}$" and "rear right acceleration indicative signal $g_{zRR}$.

The control unit 25 comprises a microprocessor 26 and driver circuits 29a, 29b, 29c, 29d, 30 and 31. The control unit 25 also includes a multiplexer 27 for multiplexing the input signals, i.e. the vehicular height indicative signals $h_{FL}$, $h_{FR}$, $h_{RL}$ and $h_{RR}$, the lateral acceleration indicative signal $g_y$, the longitudinal acceleration indicative signal $g_x$ and the vertical acceleration indicative signals $g_{zFR}$, $g_{zRL}$ and $g_{zRR}$ to selectively input to the microprocessor 26 via an analog-to-digital (A/D) converter 28. The driver circuits 29a, 29b, 29c and 29d are respectively connected to solenoids 10 of the pressure control valves 8FL, 8FR, 8RL and 8RR for feeding front left, front right, rear left and rear right driver signals to control valve positions thereof. The driver circuit 30 is connected to the ventilation control valve 9 for feeding driver signal to the latter to switch the valve position between a close position blocking communication between the pneumatic circuit and atmosphere. On the other hand, the driver circuit 31 is connected to a relay coil of the relay 16 for energizing and denergizing the relay coil.

The microprocessor 26 comprises an input/output interface 35, an arithmetic circuit 36 and a memory unit 37. The microprocessor 26 performs suspension control operation based on the input signals, i.e. the vehicular height indicative signals $h_{FL}$, $h_{FR}$, $h_{RL}$ and $h_{RR}$, the lateral acceleration indicative signal $g_y$, the longitudinal acceleration indicative signal $g_x$ and the vertical acceleration indicative signals $g_{zFR}$, $g_{zRL}$ and $g_{zRR}$ for adjusting the vehicular height so that the vehicular height at respective suspension systems 1FL, 1FR, 1RL and 1RR can be maintained within a predetermined target height range defined about a target height $H_0$. The target height range is defined by an upper and a lower height criteria $H_U$ and $H_L$. The microprocessor 26 may also performs control for suppressing attitude change of the vehicle body, e.g. anti-rolling control based on the lateral acceleration, anti-pitching control based on the longitudinal accelerations, bouncing suppressive control based on the vertical acceleration.

Though the microprocessor 26 performs various controls as set forth above, the following discussion will be concentrated to vehicle height control for maintaining the vehicular height within the target height range in order to facilitate better understanding of the invention and to avoid unnecessary confusion.

Figure 2:
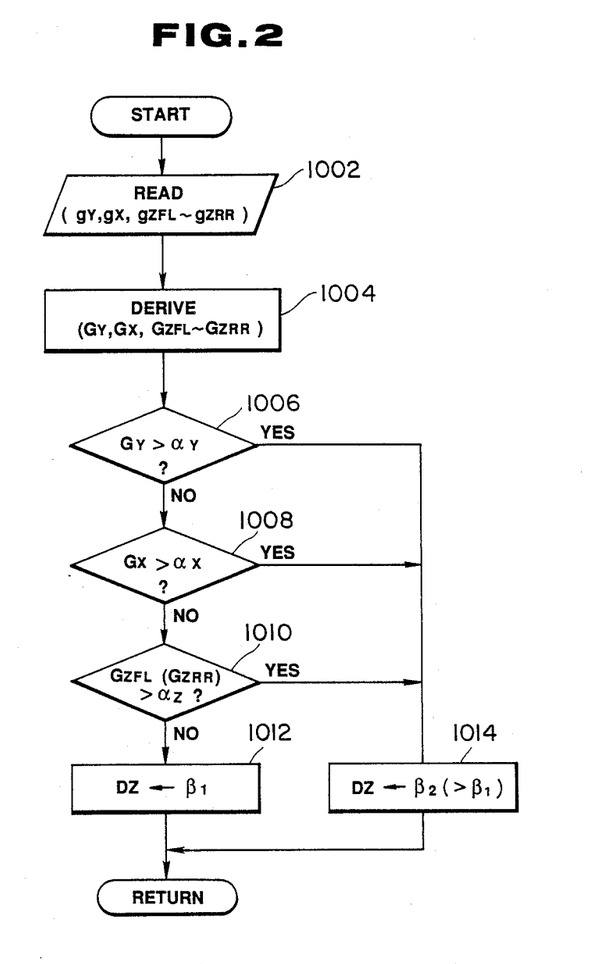
FIG. 2 is a flowchart of a routine for adjusting a target height range depending upon accelerations exerted on a vehicular body.

FIG. 2 shows a routine for setting the target vehicular height range. The shown routine is triggered every given timing, e.g. every 0.5 sec. interrupting a main program which governs various control programs.

Immediately after starting execution of the routine of FIG. 2, the lateral acceleration indicative signal $g_y$, the longitudinal acceleration indicative signal $g_x$, and the front right, rear left, and rear right vertical acceleration indicative signals $g_{zFR}$, $g_{zRL}$ and $g_{zRR}$ converted into digital form by the A/D converter 28 are read out at a step 1002. Based on the lateral acceleration indicative signal $g_y$, the longitudinal acceleration indicative signal $g_x$ and, the front right, rear left, and rear right vertical acceleration indicative signals $g_{zFR}$, $g_{zRL}$ and $g_{zRR}$, a lateral acceleration data $G_y$, a longitudinal acceleration data $G_x$ and front right, rear left, and rear right vertical acceleration data $G_{zFR}$, $G_{zRL}$ and $G_{zRR}$ are derived at a step 1004.

The lateral acceleration data $G_y$ derived at the step 1004 is compared with a lateral acceleration threshold $\alpha_y$ at a step 1006. When the lateral acceleration threshold $\alpha_y$ is a preset value for discriminating vehicular cornering conditions between a condition close to critical point where the lateral acceleration is substantially great to cause lateral slid or spinning of the vehicle and steady cornering condition. The practical value is derived on the basis of experiments and set at a value of 0.50 G for example.

When the lateral acceleration data $G_y$ is smaller than or equal to the lateral aceration threshold $\alpha_y$, the longitudinal acceleration data $G_x$ $_A$is compared with a longitudional acceleration threshold $\alpha_x$ at a step 1008. Similarly to the above, the longitudinal acceleration threshold $\alpha_x$ is determined at a value for discriminating vehicular accelerating or decelerating condition close to critical point where wheel spinning, substantial squat or substantial nose dive causing unstability of the vehicle may be caused, and steady acceleration or deceleration state. In practice, the longitudinal acceleration threshold $a_x$ is set at a experimentally obtained value, e.g. 0.5 G.

When the longitudinal acceleration data $G_x$ is smaller than or equal to the longitudinal acceleration threshold $a_x$ as checked at the step 1008, respective of the front right, rear left and rear right vertical acceleration data $G_{zFR}$, $G_{zRL}$ and $G_{zRR}$ are compared with a vertical acceleration threshold $a_z$ at a step 1010. The vertical acceleration threshold $a_z$ is set at a predetermined value close to a critical point where vehicular attitude change becomes substantial to cause the vehicle unstable condition. Practically, the vertical acceleration threshold $a_z$ is set at an experimentally obtained value, e.g. 0.5 G.

When all of the front right, rear left and rear right vertical acceleration data $G_{zFR}$, $G_{zRL}$ and $G_{zRR}$ are smaller than or equal to the vertical acceleration threshold $a_z$, a deadband adjusting value DZ which is to be added and subtracted to and from the target height value $H_0$ to drive the upper and lower criteria $H_U$ and $H_L$, is set at a value $\beta_1$, at a step 1012. The deadband adjusting value DZ ($=\beta_1$) is normal value. On the other hand, when the lateral acceleration data $G_y$ is greater than the lateral acceleration threshold $a_7$ as checked at the step 1006, the longitudinal acceleration data $G_x$ is greater than the longitudinal acceleration threshold $a_x$ as checked at the step 1008 or any one of the front right, rear left and rear right vertical acceleration data $G_{zFR}$, $G_{zRL}$ and $G_{zRR}$ is greater than the vertical acceleration threshold $a_z$ as checked at the step 1010, then, the deadband adjusting data DZ is set at a value $\beta_2$ which is greater than the value $\beta_1$ and thus widen the deadband, at a step 1014. In practice, the value $\beta_1$ is set at a value (e.g. 15 mm) which may provide sufficiently high sensitivity of detection of the vehicular height variation, and the value $\beta_2$ is set at a value Z (e.g. 40 mm) which may widen the deadband or the target height range to allow the vehicular body to cause attitude change which may notice the driver that the vehicle is driven at a condition close to the critical point.

At the steps 1012 and 1014, the deadband or the target height range is set on the basis of the derived deadband adjusting value $\beta_1$ or $\beta_2$. Thereafter, process returns to the main program.

Figure 3:
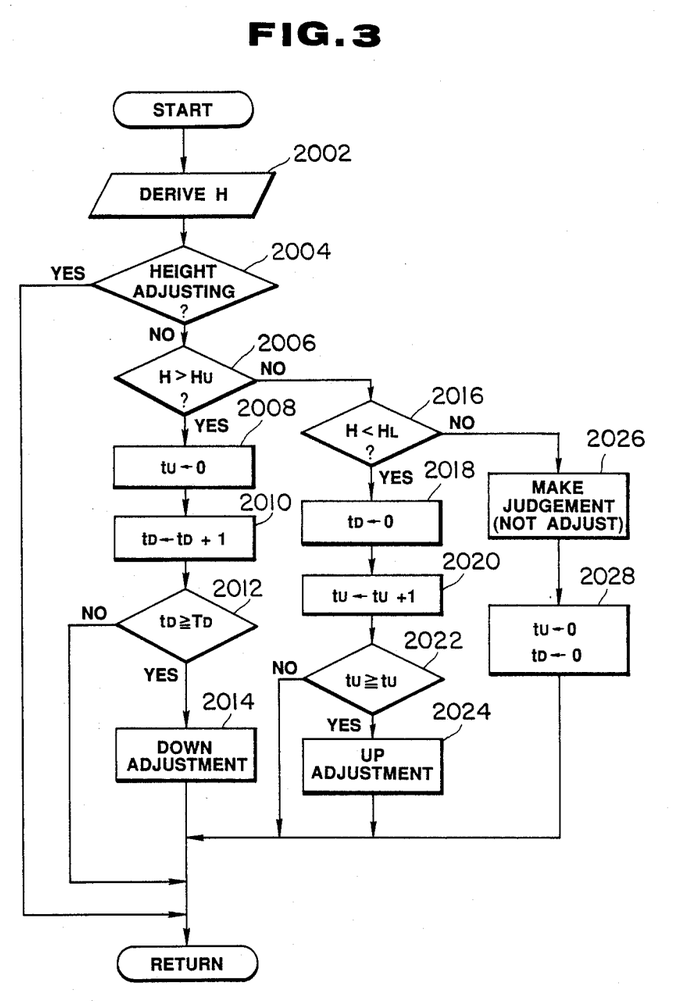
FIG. 3 is a flowchart of a routine for height adjustment for regulating the height level of the vehicular body.

FIG. 3 shows a vehicular height control routine which is also executed at a given timing, e.g. every 0.5 sec. It should be appreciated that, though the shown embodiment illustrates process for controlling vehicular height to maintain the vehicular height within the target height range by singular process and the following discussion will be given for height adjustment for one and general suspension system, the practical height adjusting or regulating operation will be performed with respect to respective front left, front right, rear left and rear right suspension systems 1FL, 1FR, 1RL and 1RR, independently of each other.

Immediately after starting execution, vehicular height data H is derived on the basis of the vehicular height indicative signal value h ($h_{FL}$, $h_{FR}$, $h_{RL}$, $h_{RR}$), at a step 2002. Thereafter, check is performed whether the status of the height regulating system is operating state for adjusting the height, at a step 2004. If height operating state as checked at the step 2004, process directly goes to END and return to the main program. On the other hand, if the status is not height adjusting state as checked at the step 2004, the vehicular height data H derived at the step 2002 is compared with the upper criterion $H_U$ defining the upper limit of the target height range, at a step 2006. When the vehicular height data H as checked at the step 2006 is greater than the upper criterion $H_U$, an UP delay timer value $t_U$ which is periodically incremented while height adjustment for rising the vehicular height is performed, is cleared at a step 2008. Thereafter, a DOWN delay timer value $t_D$ which is periodically incremented while the height adjustment for lowering the vehicular height is performed, is incremented by one (1) at a step 2010.

It should be appreciated that the UP delay timer and DOWN delay timer are provided for providing lag time between detection of the vehicular height out of the target height range to actual initiation of height adjustment so that height adjustment will never performed in response to temporary height variation out of the target height range.

At step 2012, the DOWN lag timer value $t_D$ is compared with a DOWN lag time set value $T_D$. When the DOWN lag timer value $t_D$ is smaller than the DOWN lag time set value $T_D$ as checked at the step 2012, process directly goes END to return to the main program. On the other hand, when the DOWN lad timer value $t_D$ is greater than or equal to the DOWN lag time set value $T_D$, DOWN command is output from the microprocessor 26. In response to the DOWN command, the solenoid 10 of the corresponding pressure control valve 8 maintains the valve at open position and the solenoid 11 of the ventilation control valve 9 is energized to open the valve to expose the pnuematic circuit to the atmosphere to lower the pneumatic pressure in the pneumatic chamber 3 of the relevant suspension system 1. By this, the vehicular height is lowered toward the height level defined by the upper criterion $H_U$ at a step 2014.

On the other hand, when the vehicular height data H as checked at the step 2006 is smaller than the upper threshold $H_U$, the vehicular height data H is compared with the lower threshold $H_L$ at a step 2016. If the vehicular height data H is smaller than the lower threshold $H_L$, the DOWN lag timer value $t_D$ is cleared at step 2018. Thereafter, the UP lag timer value $t_U$ is incremented by one (1) at a step 2020. The UP lag timer value $t_U$ is then compared with a UP lag time set value $T_U$ at a step 2022. When the UP lag timer value $t_U$ is smaller than the UP lag time set value $T_U$, then process directly goes END. On the other hand, when the UP lag timer value $t_U$ is greater than or equal to the UP lag time set value $T_U$, then, height adjustment for lowering the vehicular height to the lower limit of the target height range as represented by the lower criterion $H_L$, at a step 2024. In UP adjustment, an UP command is output from the microprocessor 26. Then, the driver circuit 30 feeds low level signal to maintain the solenoid 11 deenergized to maintain the ventilation control valve 9 at closed position. At the same time, the HIGH level driver signal is applied to the relay to establish electrical communication between the vehicular battery 15 and the motor 17 to drive the latter. As a result, the compressor 6 becomes active to feed pressurized air to the pneumatic circuit. At this time, the driver signal is fed to the associated solenoid 10 of the corresponding pressure control valve 8 to establish fluid communication between the pneumatic chamber 3 and the pneumatic circuit. Therefore, the pneumatic pressure is increased to rise the vehicular height.

When the vehicular height data H as checked at the step 2016 is greater than or equal to the lower threshold $H_L$, then decision is made the height adjustment is not made at a step 2026, and the UP lag timer value $t_U$ and DOWN lag timer value $t_D$ are closed at a step 2028. After step 2014, 2024 or 2028, process goes END to return to the main program.

Figure 4:
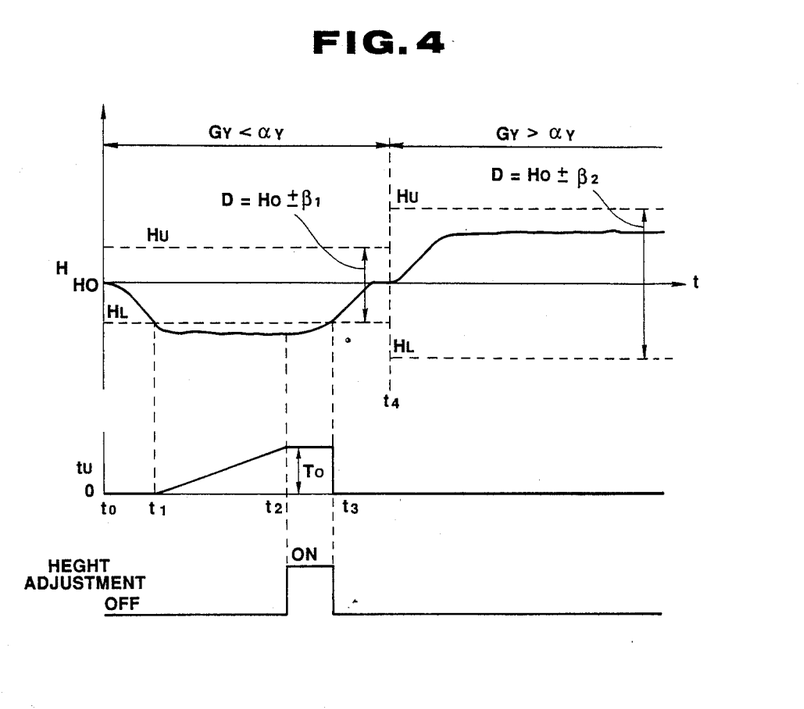
FIG. 4 is a timing chart showing one example of height regulating operation performed by the preferred embodiment of the vehicular height regulation system of the invention.
Figure 5:
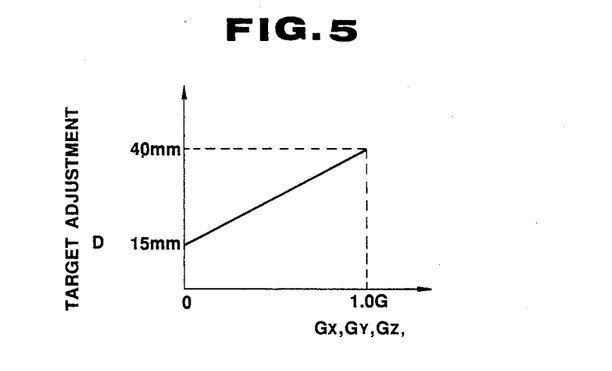
FIG. 5 is a chart showing relationship between the acceleration and the target height range, which can be introduced in the preferred embodiment of the vehicular height regulation to be implemented by the preferred embodiment of the vehicular height control system.

To further disclose the practical implementation of the process of height control to be performed by the preferred embodiment of the height regulating system, according to the present invention, example of practical control is given in FIG. 4. As seen from FIG.4, it is assumed that steering operation to cause substantial level of lateral acceleration $G_y$ greater than the lateral acceration threshold $\alpha_y$ at a time $t_4$. In such case, in a period from $t_0$ to $t_4$, the deadband adjusting value DZ is maintained at the normal value $\beta_1$. On the other hand, after the time $t_4$, the deadband adjusting value DZ is changed to the value $\beta_2$.

When the vehicular height H is lowered across the lower threshold $H_L$ ($H_0$-DZ) at a time $t_1$, the UP lag timer is started to periodically increment the timer value. After a period $T_U$ from $t_1$, UP command is output to perform UP adjustment until the vehicular height H is recovered to be higher than or equal to the lower limit $H_L$, at a time $t_3$.

At the time $t_4$, the deadband adjusting value DZ is changed to the greater value $\beta_2$. By this, the target height range defined by the upper limit $H_U$ and the lower limit $H_L$ is expanded. Therefore, as seen from FIG. 4, even when the vehicular height H is increased to be greater than the height level defined by the upper and lower limits in the normal mode, i.e. the period $t_0$ to $t_4$, height adjustment is not performed and thus allows vehicular attitude change. This technology is advantageously introduced so that the driver may easily recognize the critical condition of the vehicle.

While the present invention has been disclosed in detail in terms of the preferred embodiment, it is possible to implement the invention in various embodiments other hand the shown embodiment. Therefore, the discussion given hereabove should be appreciated as mere examples of implementation of the invention for facilitating full understanding of the invention. The present invention should thus understood to include all of possible embodiments and modifications of the shown embodiments which can be implemented without departing from the principle of the invention.

For example, though the shown embodiment varies the target height range between normal narrower range and broader range selected when the lateral longitudinal or vertical acceleration is greater than a predetermined criteria in stepwise fashion, it is possible to vary the target height range linearly in proportion to the lateral, longitudinal or vertical acceleration. Furthermore, though the shown embodiment utilized the accelerations, i.e. lateral acceleration, longitudinal acceleration, vertical acceleration, as vehicular driving condition reflecting vehicular critical condition, it may be replaced with any other parameters which can represent the vehicular critical condition. For example, the vehicular speed and the steering angular displacement or steering operation speed may be replacement of the lateral acceleration.

As will be appreciated herefrom, the present invention fulfills all of the objects and advantages sought therefor.

What is claimed is:

1. A vehicle height regulation system comprising:
   a suspension system interposed between a vehicle body and a suspension member rotatably supporting a vehicular wheel, said suspension system including a variable pressure chamber filled with a working fluid for producing a suspension force for suspending said vehicle body on said suspension member;
   a fluid circuit including a pressurized working fluid source and connected to said variable pressure chamber to adjust pressure in said variable pressure chamber and thereby adjust suspension force to be produced by said variable pressure chamber;
   a first sensor monitoring vehicular body height level to produce a first sensor signal representative thereof;
   a second sensor monitoring a preselected vehicular driving parameter representative of an unstability factor of said vehicle body in terms of a vehicular body attitude change to produce a second sensor signal; and
   a controller means for setting a target vehicular height range with respect to a predetermined target height level, said target vehicular height range variable in accordance with variation of a second sensor signal value such that when said second sensor signal indicates a greater magnitude of vehicular body attitude change, said target vehicular height range is set to a wide range and when said second sensor signal indicates a smaller magnitude of vehicular attitude change, said target vehicular body height range is set to a narrow range, and for controlling said fluid circuit to adjust said suspension force to maintain vehicular height within said target vehicular height range on the basis of said first sensor signal.

2. A vehicle height regulation system as set forth in claim 1, wherein said controller means initially sets said target vehicular height range at a narrowest range and sets a wider range in response to increasing vehicular driving unstability.

3. A vehicle height regulation system as set forth in claim 2, wherein said controller means maintains said vehicular height range at a narrowest range when vehicle driving unstability level is maintained smaller than or equal to a predetermined threshold and at a wider range when vehicle driving unstability is greater than said threshold.

4. A vehicle height regulation system as set forth in claim 3, wherein said controller means expands said target vehicular height range in proportion to increasing vehicle driving unstability.

5. A vehicle height regulation system as set forth in claim 3, wherein said controller means initially sets a narrowest target vehicular height range at a minimum vehicle driving unstability level and then linearly expands said target vehicular height range.

6. A vehicle height regulation system comprising:
   a suspension system interposed between a vehicle body and a suspension member rotatably supporting a vehicular wheel, said suspension system including a variable pressure chamber filled with a working fluid for producing a suspension force for suspending said vehicle body on said suspension member;
   a fluid circuit including a pressurized working fluid source and connected to said variable pressure chamber to adjust pressure in said variable pressure chamber and thereby adjust suspension force to be produced by said variable pressure chamber;

a first sensor monitoring vehicular body height level to produce a first sensor signal representative thereof;

a second sensor monitoring a preselected vehicular driving unstability factor to produce a second sensor signal representative thereof; and a controller means for setting a target vehicular height range with respect to a predetermined target height level, said target vehicular height range variable in accordance with variation of said second sensor signal such that when said second sensor signal is greater than a predetermined threshold value, said target vehicular height range is set to a wider range than when said second sensor signal is smaller than said predetermined threshold value, and for controlling said fluid circuit to adjust said suspension force to maintain vehicular height within said target vehicular height range on the basis of said first sensor signal.

7. A vehicle height regulation system as set forth in claim 6, wherein said controller means initially sets said target vehicular height range at a narrowest range and sets a wider range in response to increasing vehicular driving unstability.

8. A vehicle height regulation system as set forth in claim 7, wherein said controller means maintains said target vehicular height range at a narrowest range when vehicle driving unstability is maintained smaller than or equal to a predetermined threshold and at a wider range when vehicle driving unstability level is greater than said threshold.

9. A vehicle height regulation system as set forth in claim 8, wherein said controller means initially sets a narrowest target vehicular height range at a minimum vehicle driving unstability level and then linearly expands said target vehicular height range.

10. A vehicle height regulation system as set forth in claim 8, wherein said controller means expands said target vehicular height range in proportion to increasing vehicle driving unstability level.

11. A vehicle height regulation system comprising:

a suspension system interposed between a vehicle body and a suspension member rotatably supporting a vehicular wheel, said suspension system including a variable pressure chamber filled with a working fluid for producing a suspension force for suspending said vehicular body on said suspension member a fluid circuit including a pressurized working fluid source and connected to said variable pressure chamber for adjusting pressure in said variable pressure chamber and whereby adjusting suspension force to be produced by in said variable pressure chamber a first sensor for monitoring vehicular body height level to produce a first sensor signal representative thereof a second sensor for monitoring an acceleration to be exerted on the vehicular body to to produce a second sensor signal representative thereof a controller means for setting a target vehicular height range about a predetermined target height level on the bais of said second sensor signal value, and controls said fluid circuit for adjusting said suspension force to maintain the vehicular height within said target vehicular height range on the basis of said first sensor signal value.

12. A vehicle height regulating system as set forth in claim 1, wherein said controller means initially sets said target height range at a narrowest range and to set wider range in response to increasing of said acceleration.

13. A vehicle height regulating system as set forth in claim 12, wherein said controller means maintains said target height range at a narrowest range when said acceleration is maintained smaller than or equal to a predetermined threshold and set to a wider range when said acceleration is greater than said threshold.

14. A vehicle height regulating system as set forth in claim 13, wherein said controller means initially set the narrowest target height range at minimum acceleration and linearly expands the target height range.

15. A vehicle height regulating system as set forth in claim 13, wherein said controller means expands said target height range in proportion to increasing of said acceleration.

16. A vehicle height regulating system as set forth in claim 11, wherein said second sensor monitors lateral acceleration.

17. A vehicle height regulating system as set forth in claim 11, wherein said second sensor monitors a longitudinal acceleration.

18. A vehicle height regulating system as set forth in claim 11, wherein said second sensor monitors a vertical acceleration.

19. A vehicle height regulating system as set forth in claim 11, wherein said second sensor monitors a laterally exerted, longitudinally exerted and vertically exerted accelerations to adjust said target height range in response to any one of said laterally exerted, longitudinally exerted and vertically exerted accelerations.

20. A vehicle height regulating system as set forth in claim 19, wherein said controller means initially sets said target height range at a narrowest range and to set wider range in response to increasing of said acceleration.

21. A vehicle height regulating system as set forth in claim 20, wherein said controller means maintains said target height range at a narrowest range when said acceleration is maintained smaller than or equal to a predetermined threshold and set to a wider range when said acceleration is greater than said threshold.

22. A vehicle height regulating system as set forth in claim 21, wherein said controller means initially set the narrowest target height range at minimum acceleration and linearly expands the target height range.

23. A vehicle height regulating system as set forth in claim 21, wherein said controller means expands said target height range in proportion to increasing of said acceleration.

* * * * *